(12) United States Patent
Dressler et al.

(10) Patent No.: US 10,029,520 B2
(45) Date of Patent: Jul. 24, 2018

(54) BEAD BREAKING UNIT

(71) Applicant: SICAM S.R.L., Correggio (RE) (IT)

(72) Inventors: Bjoern Dressler, Correggio (IT);
Marco Vescovini, Correggio (IT);
Davide Ruspaggiari, Correggio (IT)

(73) Assignee: SICAM S.R.L., Correggio (RE) (IT)

( * ) Notice: Subject to any disclaimer, the term of this patent is extended or adjusted under 35 U.S.C. 154(b) by 552 days.

(21) Appl. No.: 14/657,207

(22) Filed: Mar. 13, 2015

(65) Prior Publication Data

US 2016/0263953 A1    Sep. 15, 2016

(30) Foreign Application Priority Data

Mar. 14, 2014  (IT) .............................. MO2014A0067

(51) Int. Cl.
*B60C 25/02* (2006.01)
*B60C 25/13* (2006.01)
*B60C 25/138* (2006.01)

(52) U.S. Cl.
CPC ............ *B60C 25/13* (2013.01); *B60C 25/138* (2013.01)

(58) Field of Classification Search
CPC .............................. B60C 25/13; B60C 25/138
USPC ................................................ 157/1.17, 1.24
See application file for complete search history.

(56) References Cited

U.S. PATENT DOCUMENTS

| | | | | |
|---|---|---|---|---|
| 4,059,140 A | * | 11/1977 | Sedgwick | ............. B60C 25/025 |
| | | | | 157/1.17 |
| 6,019,016 A | * | 2/2000 | Takagi | .................... B60K 26/02 |
| | | | | 123/399 |
| 7,434,955 B2 | | 10/2008 | Vickers et al. | |
| 2012/0298312 A1 | * | 11/2012 | Bonacini | ................. B60C 25/13 |
| | | | | 157/1.17 |

FOREIGN PATENT DOCUMENTS

EP      1 524 134 A1    4/2005
JP      2011/031645 A   2/2011

OTHER PUBLICATIONS

IT Search Report, dated Nov. 6, 2014, from corresponding IT application.

* cited by examiner

*Primary Examiner* — Hadi Shakeri
(74) *Attorney, Agent, or Firm* — Young & Thompson

(57) ABSTRACT

The bead breaking unit includes:
  a bead breaking arm having a substantially horizontal longitudinal direction, a first extremity hinged to the base frame of a tire changing machine around a substantially vertical rotation axis and an opposite second extremity having a bead breaking tool;
  an operating actuator for moving the bead breaking arm interposed between the base frame and the bead breaking arm; and
  a control lever, associated with the bead breaking arm in proximity of the second extremity for controlling the operating actuator, wherein the control lever is hinged (Continued)

around an oscillation axis substantially horizontal and parallel to the longitudinal direction and is associated with return elements for maintaining the control lever in a substantially vertical balance position, the actuator being controlled in a first direction for bead breaking the tire when the control lever is rotated towards the wheel starting from the balance position.

18 Claims, 3 Drawing Sheets

BEAD BREAKING UNIT

FIELD OF THE INVENTION

The present invention relates to a bead breaking unit for tyre changing machines.

BACKGROUND OF THE INVENTION

Tyre changing machines are commonly used for fitting/removing tyres of vehicle wheels onto/from respective rims.

As is known, before being able to completely remove a tyre, it is necessary to release its beads from the seat of the respective rim.

To perform this job, a bead breaking arm is used mounted on the tyre changing machine itself.

In practice, the known tyre changing machines include a bead breaking unit comprising a bead breaking arm arranged horizontally and having a first extremity hinged to a side of the body or base of the machine itself, outside of it.

The arm has a second extremity having a bead breaking tool, also called "blade".

The arm is operated by a pneumatic or hydraulic cylinder which is also associated with the side of the base on which the bead breaking arm is hinged, but on the inner side of the body.

On said side of the body, the base has a protruding portion provided with an abutting surface that cooperates with the blade to carry out bead breaking.

The pneumatic or hydraulic cylinder is operated through one or more pedal controls positioned in the front part of the base, where, however, they are particularly uncomfortable to use taking into account the fact that, during bead breaking, the operator also needs to keep a hand on the blade or on a grip handle of the blade itself.

To overcome this drawback bead breaking units are known, such as that shown in the patent document U.S. Pat. No. 7,343,955, in which the pneumatic or hydraulic cylinder is operated through a control lever, substantially horizontal, which is mounted on an upright that rises from the bead breaking arm.

The control lever operates a valve that opens and closes a pneumatic circuit for feeding the cylinder, for its movement in one direction rather than the other.

Even this embodiment, however, has several drawbacks.

It should be noticed, in fact, that during bead breaking, particularly in case of very hard tyres, the release of the tyre from the rim takes place suddenly when the force applied by the blade exceeds a certain threshold value, beyond which the bead is separated from the rim.

At the time of release, the bead stops resisting the advancement of the blade almost instantaneously and the bead breaking arm, without opposition, rotates abruptly and also drags with it the operator's hand holding the control lever.

The bead breaking job is therefore rather uncomfortable and unpleasant for the operator, who is pulled and suffers the backlash of the bead breaking arm that rotates almost instantaneously.

Furthermore, at the time of sudden release of the bead, most of the times the operator loses control sensitivity of the control lever, with the risk of not being able to properly control the stopping of the bead breaking arm after releasing, and therefore of damaging the tyre or the wheel rim.

SUMMARY OF THE INVENTION

The main aim of the present invention is to provide a bead breaking unit for tyre changing machines which is safer and more practical to use and avoids jerks and backlashes on the operator's hand.

A further object of the present invention is to provide a bead breaking unit for tyre changing machines which allows a high control of the bead breaking process by the operator, thus avoiding any possibility of damaging the tyre or the wheel rim due to improper use of the cylinder's strength.

Another object of the present invention is to provide a bead breaking unit for tyre changing machines which allows to overcome the mentioned drawbacks of the prior art within the ambit of a simple, rational, easy, effective to use as well as affordable solution.

The above mentioned objects are achieved by the present bead breaking unit for tyre changing machines having the characteristics of claim 1.

BRIEF DESCRIPTION OF THE DRAWINGS

Other characteristics and advantages of the present invention will become better evident from the description of a preferred, but not exclusive embodiment of a bead breaking unit for tyre changing machines, illustrated by way of an indicative, but not limitative example in the accompanying drawings in which.

DETAILED DESCRIPTION OF THE INVENTION

Figure 1:
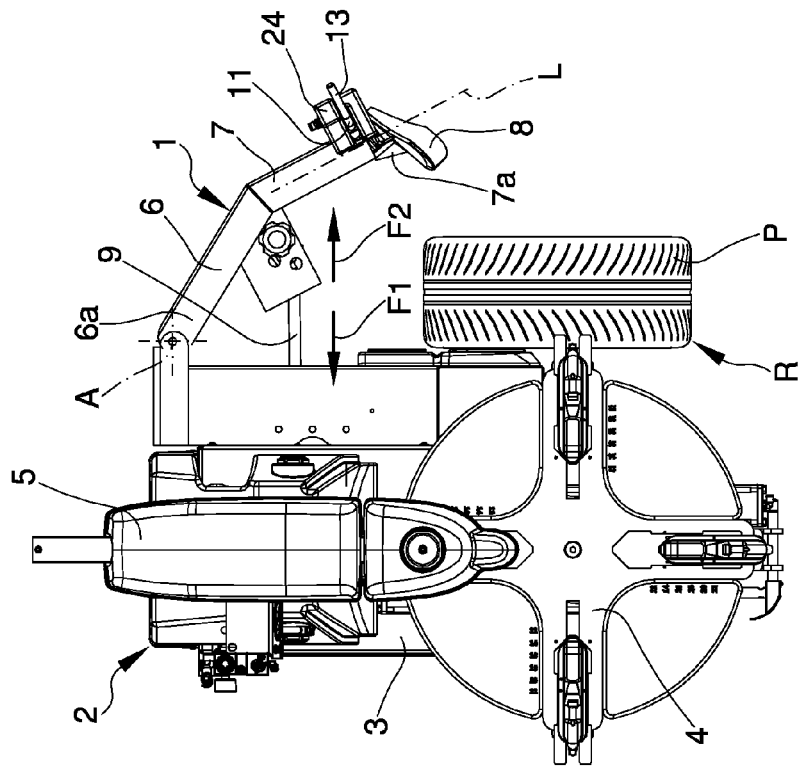
FIG. 1 is an axonometric view of a tyre changing machine equipped with the bead breaking unit according to the invention.

With particular reference to such figures, reference number 1 globally designates a bead breaking unit for tyre changing machines.

The bead breaking unit 1 is mounted on a tyre changing machine 2 and can be used for the first release of bead T of a tyre P from the respective rim C of a wheel R, prior to the removal operation of the tyre itself on the tyre changing machine 2.

In detail, the tyre changing machine 2 is of the type comprising a base frame 3 resting on the ground, on which are carried a gripping and rotating unit 4 of the rim C and an upper arm 5, having a tool to remove/fit 5a the tyre P, as a result of its preliminary bead breaking.

On one side of the base frame 3 is associable the bead breaking unit 1.

The bead breaking unit 1 comprises at least a bead breaking arm 6, 7 having a substantially horizontal longitudinal direction L, a first extremity 6a hinged to the base frame 3 of the tyre changing machine 2 around a substantially vertical rotation axis A, and a second extremity 7a opposite the first one having a bead breaking tool 8 able to carry out the bead breaking of the tyre P of the wheel R, e.g. a so-called bead breaking "blade".

In the particular embodiment shown in the illustrations, the bead breaking arm 6, 7 comprises a first section 6, in the proximity of the first extremity 6a, and a second section 7, in the proximity of the second extremity 7a.

Both sections 6, 7 are substantially rectilinear and are inclined one with respect to the other.

In this embodiment the longitudinal direction L is defined by the direction along which the second section 7 extends.

Alternative embodiments are not ruled out, however, wherein the bead breaking arm 6, 7 has a different shape and is made up, e.g., of a single rectilinear section or of one or more curved sections.

In any case the longitudinal direction L of the bead breaking arm 6, 7 is defined by the main direction (defined as the horizontal direction of greater extension) of the bead breaking arm 6, 7 in the proximity of the second extremity 7a.

The bead breaking unit 1 comprises at least an operating actuator 9 for the movement of the bead breaking arm 6, 7 in rotation around the rotation axis A.

The operating actuator 9 is interposed between the base frame 3 and the bead breaking arm 6, 7.

Conveniently, the operating actuator 9 is of the fluid type, i.e. consists of a pneumatic or hydraulic actuator, such as a cylinder/piston pair, and is connected to an activation fluidic circuit.

The outer side of the base frame 3 may have at least a contrasting surface 10, substantially vertical, against which, in use, is positioned, also vertically, the wheel R with the tyre P to undergo bead breaking, i.e. with its central axis arranged horizontally.

The contrasting surface 10 is able to cooperate with the bead breaking tool 8 to carry out bead breaking of tyre P.

Such a contrasting surface 10 is knurled so as to increase the coefficient of friction with the wheel R placed in abutment thereof.

In practice, the bead breaking arm 6, 7 is able to oscillate, upon activation of the operating actuator 9, between a position of disengagement, wherein the blade 8 is mostly moved away from the contrasting surface 10, and a position of intervention, wherein the blade 8 is moved closer with respect to the contrasting surface 10 and is able to engage on one side of the tyre P.

The bead breaking unit 1 comprises at least a control lever 11, associated with the bead breaking arm 6, 7 in the proximity of the second extremity 7a and able to control the operating actuator 9.

More in detail, the control lever 11 is hinged around a oscillation axis B substantially horizontal and parallel to the longitudinal direction L and is associated with return means 12 for the maintenance of the control lever 11 in a substantially vertical balance position.

The control lever 11 comprises a lower extremity 11a hinged around the oscillation axis B and an upper extremity 11b having a grip handle 13.

In particular, the lower extremity 11a consists, e.g., in a cylindrical foot that extends along the oscillation axis B, the extremities of which are supported in a rotoidal manner by two substantially vertical walls 14 associated with the bead breaking arm 6, 7.

The upper extremity 11b, on the other hand, consists in a point where the control lever 11 changes its inclination from a vertical piece (at least in the balance position), defined between the lower extremity 11a and the upper extremity 11b, to an inclined piece, defined by a terminal part which extends beyond the upper extremity 11b and which makes up the grip handle 13.

Thanks to the control lever 11, the operating actuator 9 is controlled in a first direction, represented by arrow F1, for bead breaking of tyre P when the control lever 11 is rotated towards the wheel R starting from the balance position, i.e. when the grip handle 13 is moved by the operator so as to get closer to the wheel R.

Conveniently, the operating actuator 9 is double acting and is controlled in a second direction, represented by arrow F2 opposite to the first direction F1, when the control lever 11 is rotated on the other side with respect to the wheel R starting from the balance position, i.e. when the grip handle 13 is moved by the operator so as to move away from the wheel R.

The length of the control lever 11 between the lower extremity 11a and the upper extremity 11b is more than or equal to 10 cm.

More in detail, the length of the control lever 11 between the lower extremity 11a and the upper extremity 11b is between 20 cm and 40 cm, and more precisely equal to approx. 28 cm.

The length of the control lever 11 contributes, as will be better described below, to make the bead breaking operation easier and more practical.

The lower extremity 11a is associated with a linkage rod 15 connected to a control distributor 16 mounted on the bead breaking arm 6, 7.

Figure 2:
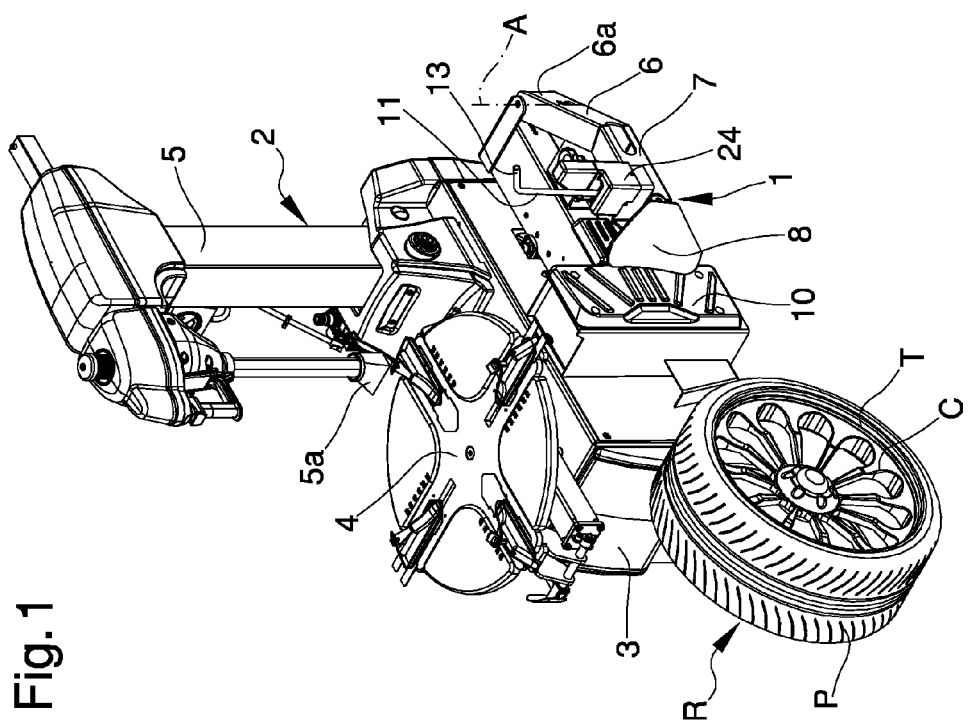
FIG. 2 is a plan view of the tyre changing machine equipped with the bead breaking unit according to the invention.
Figure 3:
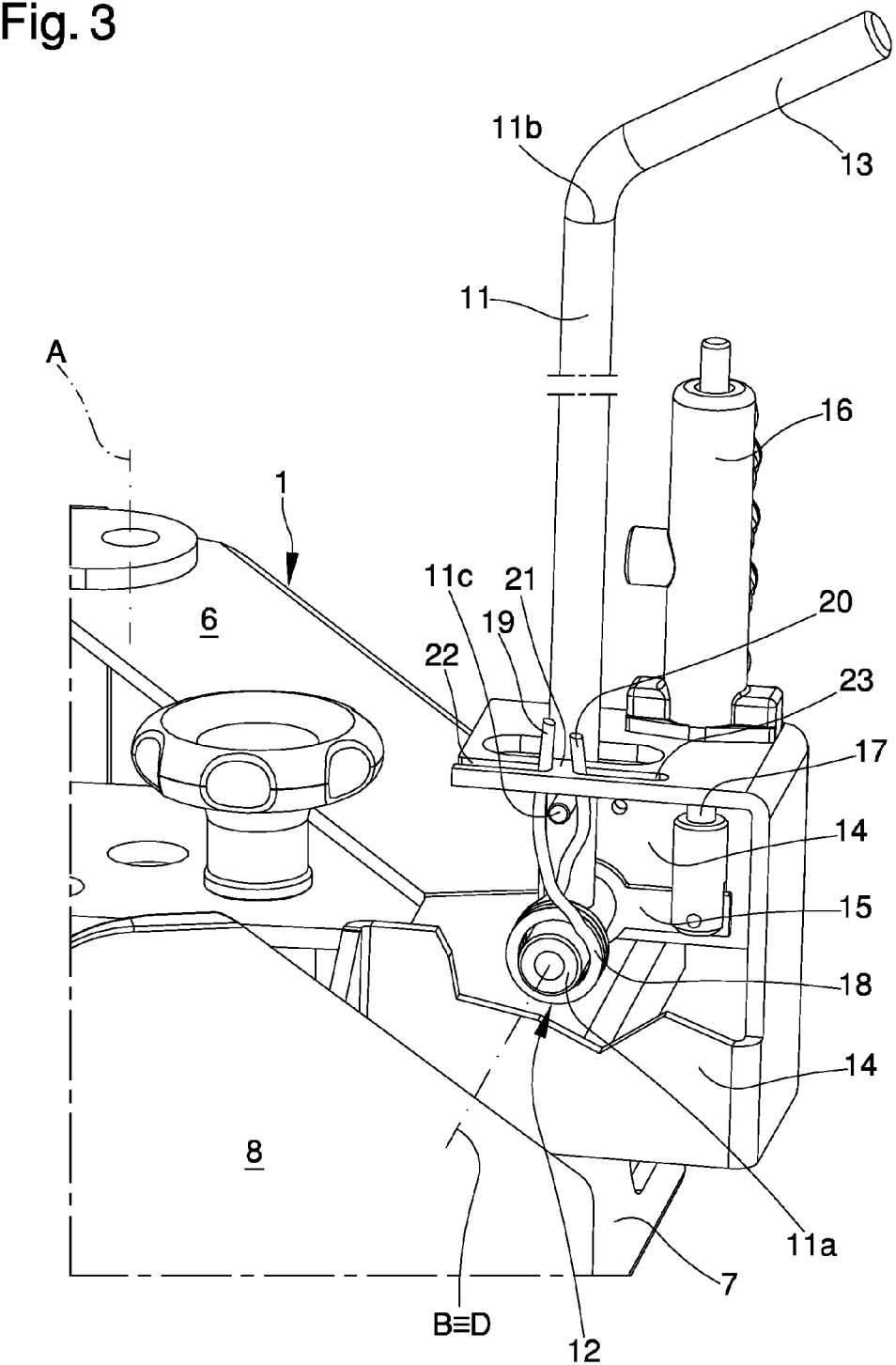
FIG. 3 is an axonometric, partially broken away view of a detail of the bead breaking unit according to the invention.

The control distributor 16, as well as other parts of the bead breaking unit 1, is covered by a protective casing 24 shown in FIGS. 1 and 2 and is visible in the subsequent FIGS. 3 to 6, in which the protective casing 24 is not represented for simplicity's sake.

The control distributor 16 is inserted into and is part of the activation fluidic circuit connected to the operating actuator 9.

The control distributor 16, in practice, consists e.g. in a three-way or more distribution valve, having a slider 17, which allows to direct the fluid to the operating actuator 9 to control its movement in the first direction F1 or in the second direction F2.

The slider 17 moves vertically and is associated with the linkage rod 15, which on the other hand extends horizontally from the lower extremity 11a of the control lever 11.

The return means 12 used to maintain the control lever 11 in the balance position are of the elastic type.

More in detail, the return means 12 comprise a helical torsion spring 18, 19, 20, having:
  a spiral-shaped portion 18 wound around a winding axis D substantially parallel to the oscillation axis B; and
  a first apex 19 and a second apex 20 able to be arranged in abutment on opposite sides of a portion 11c of the control lever 11.

In the particular embodiment shown in the illustrations, the spiral-shaped portion 18 is arranged around the lower extremity 11a and the winding axis D coincides with the oscillation axis B.

For the operation of the return means 12 at least an abutment element 21 is provided which is associated with the bead breaking arm 6, 7, the first apex 19 and the second apex 20 being able to be arranged in abutment on opposite sides of the abutment element 21.

In particular, the first apex 19 and the second apex 20 are inserted into a first slot 22 and a second slot 23 respectively, the abutment element 21 consisting in a section of the bead breaking arm 6, 7 arranged between two end portions of the slots 22, 23.

The portion 11c of the control lever 11 consists, e.g., in a pin which protrudes horizontally and is substantially arranged in the space defined between the abutment element 21 and the winding axis D.

In the balance position, the apices 19, 20 of the helical torsion spring 18, 19, 20 abut on both opposite sides both of the portion 11c of the control lever 11 and of the abutment element 21, while keeping the control lever 11 substantially vertical.

When the operator manually rotates the control lever 11 in the direction corresponding to the first direction F1, i.e. when the grip handle 13 is moved in the approaching direction to the wheel R, the portion 11c rotates together with the control lever 11 in contrast to the first apex 19, while the second apex 20 abuts on the abutment element 21.

When the operator manually rotates the control lever 11 in the direction corresponding to the second direction F2, i.e. when the grip handle 13 is moved in the direction away from the wheel R, the portion 11c rotates together with the control lever 11 in contrast to the second apex 20, while the first apex 19 abuts on the abutment element 21.

The operation of the present invention is as follows.

Once the wheel R to undergo bead breaking is positioned on the contrasting surface 10, the operator rotates the control lever 11 around the oscillation axis B so as to approach the grip handle 13 towards the wheel R.

The tilting of the control lever 11 rotates the linkage rod 15, which moves the slider 17 of the control distibutor 16 so as to control the movement of the operating actuator 9 in the first direction F1; in the particular embodiment shown in the illustrations, the slider 17 moves upwards.

Figure 4:
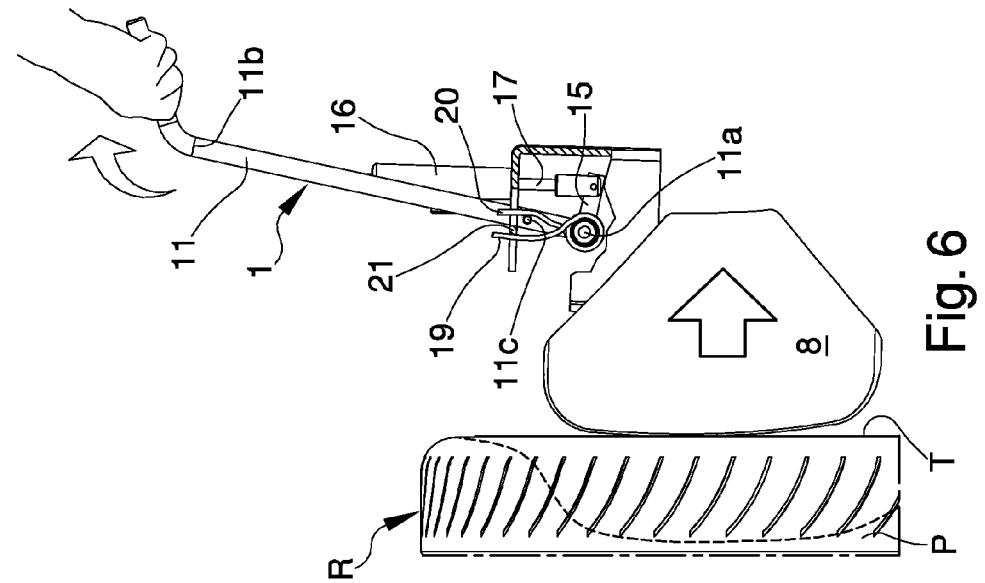
FIGS. 4 to 6 illustrate, in a succession of sectional views, the operation of the bead breaking unit according to the invention.

The activation of the operating actuator 9 sets in rotation the bead breaking arm 6, 7 around the rotation axis A by moving the bead breaking tool 8 close to the wheel R until it contacts the bead T which has to undergo bead breaking (FIG. 4).

From this moment on the bead breaking tool 8 begins to push the bead T in the direction that leads it to move away from rim C.

Most of the times the release occurs suddenly, in particular during the bead breaking of particularly hard tyres P, when the force applied by the bead breaking tool 8 on the bead T exceeds a certain threshold value, beyond which the bead T is separated from the rim C.

From this moment on the bead T stops resisting to the bead breaking tool 8 almost instantaneously and the bead breaking arm 6, 7, no more in opposition, rotates abruptly by a certain angle, approximately 12°.

Figure 5:
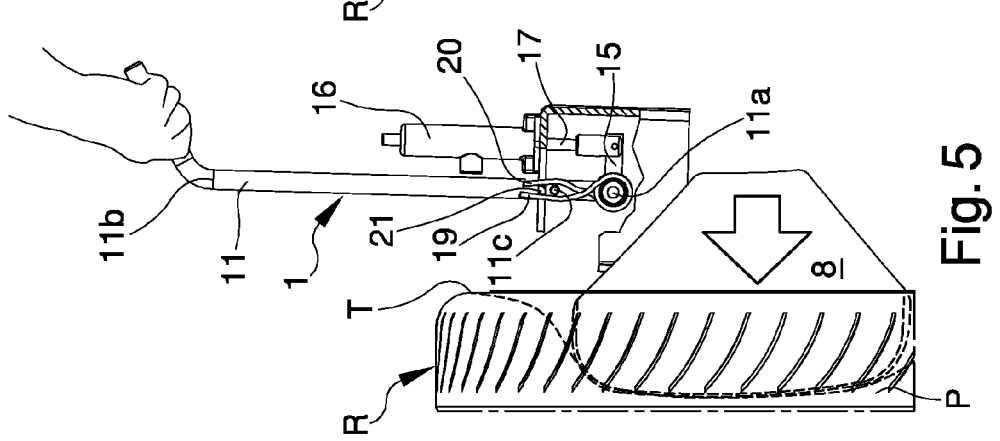

The rotation of the bead breaking arm 6, 7 does not involve the dragging and the jostling of the operator's hand since, at the same time as the bead breaking arm 6, 7, also the lower extremity 11a of the control lever 11 rotates, which tilts around the oscillation axis B going back to the balance position (FIG. 5).

In this way also the activation of the operating actuator 9 will automatically stop, which stops to rotate the bead breaking arm 6, 7 thus avoiding to damage the tyre P.

It should be noticed that in the switch from the position of FIG. 4 to that of FIG. 5 the operator's hand remains nearly stationary; this circumstance is obtained thanks to the fact that the control lever 11 is substantially vertical and rotates, in contrast to the return means 12, around the oscillation axis B, which is substantially parallel to the longitudinal direction L.

During bead breaking, the longitudinal direction L and the oscillation axis B are substantially parallel to the contrasting surface 10 and substantially orthogonal to the central axis of the wheel R positioned against it; at the time of release of the bead T from rim C, therefore, the control lever 11 returns to its balance position by simply following the movement of the bead breaking arm 6, 7.

To make the bead breaking operation very practical and easy also contributes the length of the control lever 11 since it allows:
- the operator to access the grip handle 13 without bending;
- moving the slider 17 with great sensitivity and precision;
- moving the slider 17 without effort, as it helps to define a convenient lever.

To extract the bead breaking tool 8 from wheel R, the operator only needs to swing the control lever 11 in the direction that corresponds to the movement of the grip handle 13 away from wheel R.

This swinging rotates the linkage rod 15, which moves the slider 17 of the control distributor 16 so as to control the movement of the operating actuator 9 in the second direction F2; in the particular embodiment shown in the figures, the slider 17 moves downward.

Figure 6:
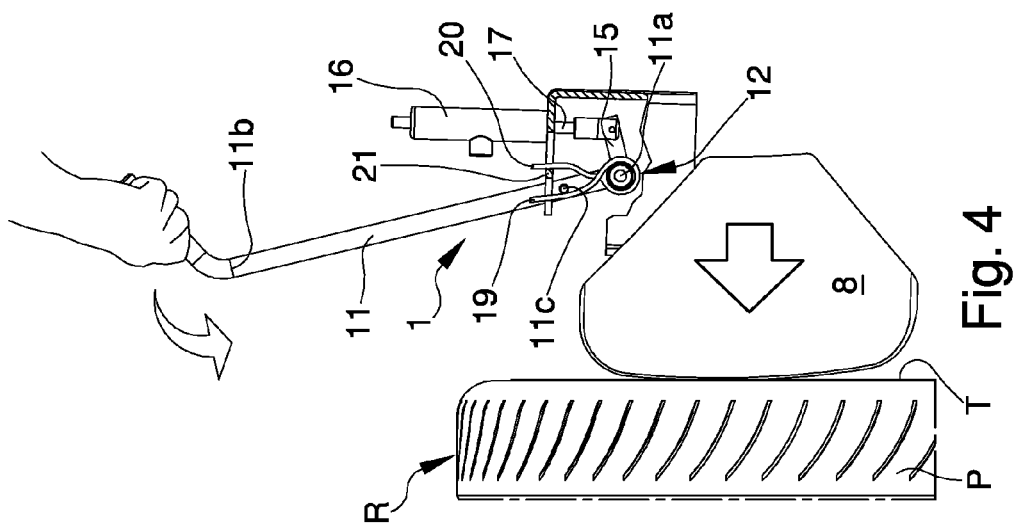

The activation of the operating actuator 9 sets in rotation the bead breaking arm 6, 7 around the rotation axis A and moves the bead breaking tool 8 away from the wheel R (FIG. 6).

The invention claimed is:

1. A bead breaking unit (1) for tire changing machines, comprising:
   at least a bead breaking arm (6, 7) having a substantially horizontal longitudinal direction (L), a first extremity (6a) of the bead breaking arm hinged to a base frame (3) of a tire changing machine (2) around a substantially vertical rotation axis (A), and an opposite second extremity (7a) of the bead breaking arm having a bead breaking tool (8) configured to carry out the bead breaking of the tire (P) of a wheel (R);
   at least an operating actuator (9) for the movement of said bead breaking arm (6, 7) interposed between said base frame (3) and said bead breaking arm (6, 7); and
   at least a control lever (11), mounted to said bead breaking arm (6, 7) in the proximity of said second extremity (7a) and configured to control said operating actuator (9),
   wherein said control lever (11) is hinged around a oscillation axis (B) that is substantially horizontal and parallel to said longitudinal direction (L), and is urged by return means (12) into a substantially vertical balance position,
   said operating actuator (9) being controlled in a first direction (F1) for the bead breaking of said tire (P) when said control lever (11) is rotated towards said wheel (R) starting from said balance position,
   wherein said return means (12) comprise a helical torsion spring (18, 19, 20) having a first apex (19) and a second apex (20) able to be arranged in abutment on opposite sides of a portion (11c) of said control lever (11), and
   wherein said bead breaking arm (6, 7) comprises an abutment element (21), said first apex (19) and said second apex (20) being able to be arranged in abutment on opposite sides of said abutment element (21).

2. The bead breaking unit (1) according to claim 1, wherein said control lever (11) comprises a lower extremity (11a) hinged around said oscillation axis (B) and an upper extremity (11b) provided with a grip handle (13).

3. The bead breaking unit (1) according to claim 2, wherein the length of said control lever (11) between said lower extremity (11a) and said upper extremity (11b) is more than or equal to 10 cm.

4. The bead breaking unit (1) according to claim 2, wherein the length of said control lever (11) between said lower extremity (11a) and said upper extremity (11b) is between 20 cm and 40 cm.

5. The bead breaking unit (1) according to claim 2, wherein:
said operating actuator (9) is of the fluid type and is connected to an activation fluidic circuit; and
said lower extremity (11a) is in connection with a linkage rod (15) connected to a control distributor (16) mounted on said bead breaking arm (6, 7) and inserted in said fluidic circuit.

6. The bead breaking unit (1) according to claim 5, wherein said operating actuator (9) of fluid type is double acting and controlled in a second direction (F2) opposite to said first direction (F1) when said control lever (11) is rotated on the other side of said wheel (R) starting from said balance position.

7. The bead breaking unit (1) according to claim 1, wherein said helical torsion spring (18, 19, 20) has a spiral-shaped portion (18) wound around a winding axis (D) substantially parallel to said oscillation axis (B).

8. The bead breaking unit (1) according to claim 7, wherein said winding axis (D) coincides with said oscillation axis (B).

9. A tire changing machine (2), comprising:
at least a base frame (3) resting on the ground;
at least a gripping and rotating unit (4) for a rim (C) of a wheel (R) mounted on said base frame (3);
at least an upper arm (5) mounted on said base frame (3); and
at least a bead breaking unit (1) according to claim 1.

10. A bead breaking unit (1) for tire changing machines, comprising:
at least a bead breaking arm (6, 7) having a substantially horizontal longitudinal direction (L), a first extremity (6a) of the bead breaking arm hinged to a base frame (3) of a tire changing machine (2) around a substantially vertical rotation axis (A), and an opposite second extremity (7a) of the bead breaking arm having a bead breaking tool (8) configured to carry out the bead breaking of the tire (P) of a wheel (R);
at least an operating actuator (9) for the movement of said bead breaking arm (6, 7) interposed between said base frame (3) and said bead breaking arm (6, 7); and
at least a control lever (11), mounted to said bead breaking arm (6, 7) in the proximity of said second extremity (7a) and configured to control said operating actuator (9),
wherein said control lever (11) is hinged around a oscillation axis (B) that is substantially horizontal and parallel to said longitudinal direction (L), and is urged by return means (12) into a substantially vertical balance position,
said operating actuator (9) being controlled in a first direction (F1) for the bead breaking of said tire (P) when said control lever (11) is rotated towards said wheel (R) starting from said balance position
wherein said return means (12) comprise a helical torsion spring (18, 19, 20) having a first apex (19) and a second apex (20) able to be arranged in abutment on opposite sides of a portion (11c) of said control lever (11),
wherein said helical torsion spring (18, 19, 20) has a spiral-shaped portion (18) wound around a winding axis (D) substantially parallel to said oscillation axis (B),
wherein said bead breaking arm (6, 7) comprises at least an abutment element (21), said first apex (19) and said second apex (20) being able to be arranged in abutment on opposite sides of said abutment element (21), and
wherein said portion (11c) of the control lever (11) is arranged between said abutment element (21) and said winding axis (D).

11. A tire changing machine (2), comprising:
at least a base frame (3) resting on the ground;
at least a gripping and rotating unit (4) for a rim (C) of a wheel (R) mounted on said base frame (3);
at least an upper arm (5) mounted on said base frame (3); and
at least a bead breaking unit (1) according to claim 10.

12. The bead breaking unit (1) according to claim 10, wherein said control lever (11) comprises a lower extremity (11a) hinged around said oscillation axis (B) and an upper extremity (11b) provided with a grip handle (13).

13. The bead breaking unit (1) according to claim 12, wherein the length of said control lever (11) between said lower extremity (11a) and said upper extremity (11b) is more than or equal to 10 cm.

14. The bead breaking unit (1) according to claim 12, wherein the length of said control lever (11) between said lower extremity (11a) and said upper extremity (11b) is between 20 cm and 40 cm.

15. The bead breaking unit (1) according to claim 12, wherein:
said operating actuator (9) is of the fluid type and is connected to an activation fluidic circuit; and
said lower extremity (11a) is in connection with a linkage rod (15) connected to a control distributor (16) mounted on said bead breaking arm (6, 7) and inserted in said fluidic circuit.

16. The bead breaking unit (1) according to claim 15, wherein said operating actuator (9) of fluid type is double acting and controlled in a second direction (F2) opposite to said first direction (F1) when said control lever (11) is rotated on the other side of said wheel (R) starting from said balance position.

17. The bead breaking unit (1) according to claim 10, wherein said helical torsion spring (18, 19, 20) has a spiral-shaped portion (18) wound around a winding axis (D) substantially parallel to said oscillation axis (B).

18. The bead breaking unit (1) according to claim 17, wherein said winding axis (D) coincides with said oscillation axis (B).

* * * * *